March 26, 1968 C. A. GRANTOM 3,375,013
FLUID-ACTUATED WIPER APPARATUS
Filed Sept. 20, 1965
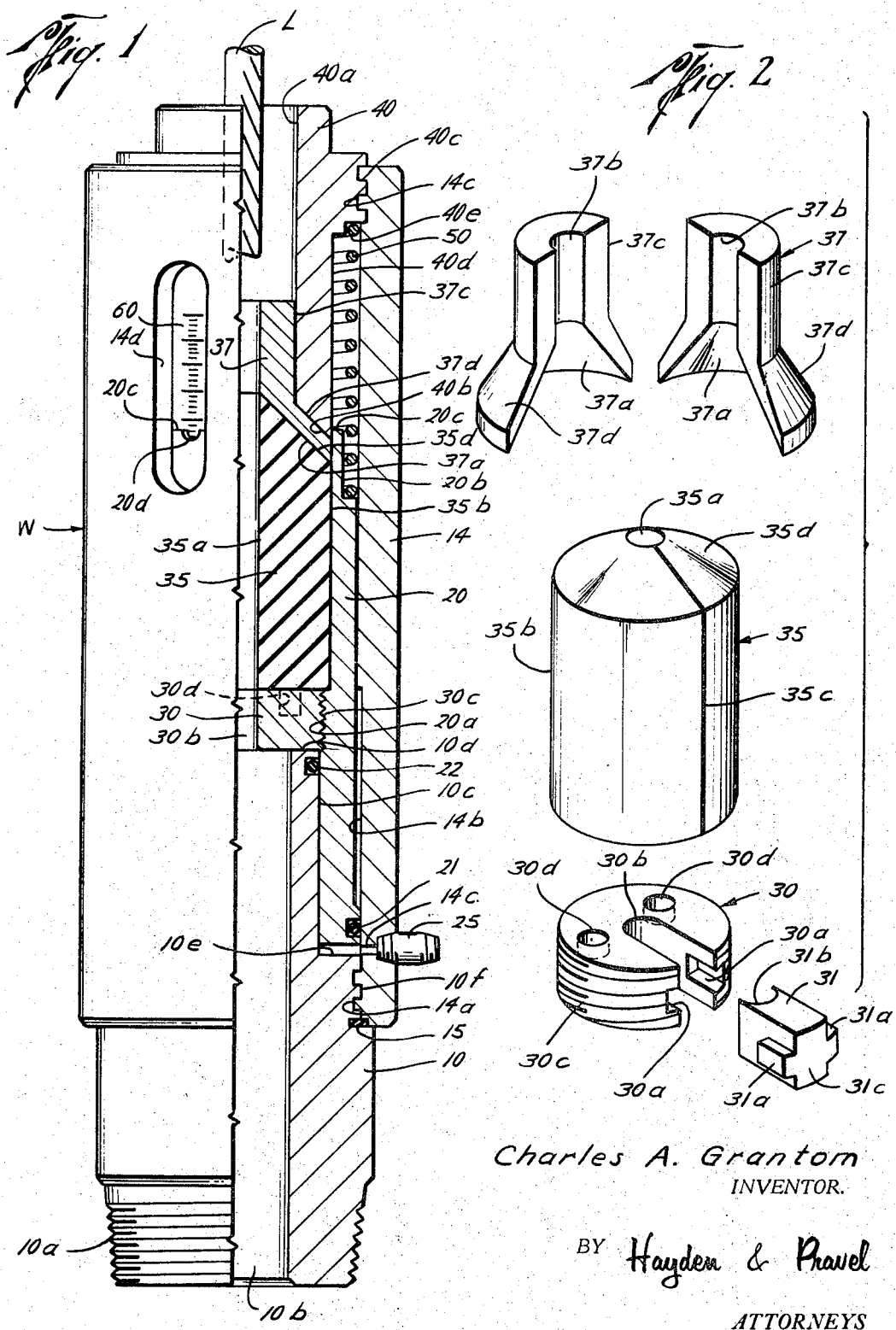
Charles A. Grantom
INVENTOR.
BY Hayden & Pravel
ATTORNEYS

United States Patent Office 3,375,013
Patented Mar. 26, 1968

3,375,013
FLUID-ACTUATED WIPER APPARATUS
Charles A. Grantom, Houston, Tex., assignor to King Oil Tools, a corporation of Texas
Filed Sept. 20, 1965, Ser. No. 488,673
3 Claims. (Cl. 277—2)

ABSTRACT OF THE DISCLOSURE

A fluid-actuated wiper apparatus wherein a resilient annular wiping element is confined on the outside by a piston before and during compression, and wherein the housing is a substantially cylindrical sleeve with threaded connections at its upper and lower ends to provide ready accessibility of all parts for replacements or repair.

Various efforts have been made in the past to provide wiping or stripper apparatus. See, for example, United States Patents Nos. 2,559,321; 2,927,638; 3,013,825; and 3,129,009.

An object of this invention is to provide a new and improved wiping or stripper apparatus wherein a wiping element for engagement with a wire-line, rod, pipe or the like is confined within an annular piston which moves in a housing so that the external surface of the wiping element does not frictionally engage the inside surface of the housing, whereby wear on the wiping element is reduced.

An important object of this invention is to provide a new and improved wiping or stripper apparatus which is adapted to be readily separated into its components for the replacement and/or repair thereof.

Another object of this invention is to provide a new and improved wiping or stripper apparatus for a wire-line or other elongate object having a fixed housing with an annular piston longitudinally movable therein, such piston extending into a recess during longitudinal reciprocation thereof for confining a wiping element out of frictional contact with the housing, and the wiping element being disposed longitudinally between upper and lower bushings which are removable while the wire-line or other elongate object is still longitudinally extending through the housing.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is a view, partly in elevation and partly in section, illustrating the preferred form of the present invention; and FIG. 2 is an exploded view illustrating the wiping element and the upper and lower stop rings employed in the apparatus of FIG. 1 to facilitate the removal of such parts or components from a wire-line or other elongate element in use.

In the drawings, the letter W indicates generally the wiping or stripping apparatus of this invention. Briefly, the apparatus W is adapted to wipe or strip well fluids, mud and the like from a wire-line L or any other elongate element such as a rod or pipe, by a longitudinal movement of such elongate element L relative to the apparatus W, normally during the upward travel of the element L from a well.

Considering the invention more in detail, the wiping or stripping apparatus W includes a lower body 10 which has external threads 10a thereon for threading or otherwise connecting to a section of tubing or other well head equipment. The body 10 has a longitudinal central bore or passage 10b therethrough, through which the line or element L is adapted to extend. The diameter of such bore or passage 10b is considerably larger than the line or element L under normal circumstances as illustrated in FIG. 1 of the drawings. The body 10 is also formed with an annular external recess 10c and an upper laterally extending shoulder 10d. A lower annular surface 10e forms the lower extremity of the annular recess 10c. External relatively coarse threads 10f are provided below the annular surface 10e for a purpose to be hereinafter described.

An outer housing or sleeve 14, which has lower internal relatively coarse threads 14a is releasably connected to the body 10 by a threaded engagement between the threads 10f and 14a. A seal ring 15 formed of rubber or other suitable resilient material is preferably disposed between the housing 14 and the body 10 as illustrated in FIG. 1 for providing a fluid seal adjacent the threads 14a and 10f.

The body 14 extends upwardly around the recess 10c to form a piston cylinder in which an annular piston 20 extends. The piston 20 carries an annular ring 21 formed of rubber or other suitable sealing material, commonly called an O-ring, which forms a fluid-tight seal with internal surface 14b of the housing 14. The internal surface of the piston 20 is in sealing engagement with another O-ring 22 so that fluid under pressure which is introduced below the piston 20 is confined for transferring the fluid pressure to move the piston 20 longitudinally, as will be more evident hereinafter.

The housing 14 has a lateral opening 14c therethrough, which may have a pipe fitting 25 threaded thereinto for connection to a suitable source of fluid under pressure (not shown), whereby fluid under pressure may be introduced into the piston cylinder below the piston 20. Several of such openings or ports 14c may be provided if desired.

The annular piston 20 carries a movable ring 30 therewith. Preferably, the ring 30 is formed with a removable segment 31 (FIG. 2) which is laterally removable with respect to the rest of the ring 30. Such segment 31 has lugs 31a thereon which fit into corresponding grooves 30a as best seen in FIG. 2. When the segment 31 is in position with the lugs 31a disposed in the grooves 30a, the inner curved surface 31b forms together with the curved surface 30b a circular bore through which the line or elongate element L extends. The surfaces 30b and 31b are normally engaged by the external surface of the line L and therefore are subjected to wear, so that normally they are formed of bronze or a similar material which is not as hard as the material of the line or elongate element L. For enabling the ring 30 to be replaced, it is preferably threaded or otherwise rotatably connected to the piston 20. Thus, threads 30c are provided on the external surface of the ring 30, with the exception of the external surface 31c of the segment 31. The threads 30c are in threaded engagement with internal corresponding threads 20a formed at an intermediate point of the piston 20. Wrench openings 30d are provided in the upper surface of the ring 30 for receiving lugs from a spanner type wrench to facilitate the removal of the ring 30 from the piston 20.

A wiping element 35 formed of rubber or other resilient material is mounted above the ring 30 and is provided with a longitudinal bore or opening 35a which coincides with the opening defined by the curved surfaces 30b and 31b.

It is to be noted that the annular piston 20 extends upwardly around the external surface 35b of the wiping element 35 so as to prevent frictional engagement of such surface 35b with the interior of the housing 14 during the longitudinal compression and lateral distortion of the wiping element 35, as will be more evident hereinafter.

To facilitate the removal of the wiping element 35 from the line or elongate element L for replacement and/or repair purposes, the element 35 is preferably split as indicated at 35c and due to its flexibility, the element 35 may thus be laterally removed with respect to the line or element L after being raised upwardly above the housing 14, as will be more fully explained.

The upper end of the wiping element 35 is inclined as indicated at 35d for engagement with a correspondingly tapered lower surface 37a of a stop ring 37. The stop ring 37 is preferably made in two segments (FIG. 2) for enabling the stop ring 37 to be removed from the line or element L laterally for replacement and/or repair purposes. When the segments of the ring 37 are disposed together in usage, the semi-circular inner bore surfaces 37b form a cylindrical bore which corresponds with and is in alignment with the bore 35a of the wiping element 35 and the bore of the ring 30 which is defined by the surfaces 30b and 31b. Preferably the stop ring 37 is also formed of bronze or a similar material which is relatively soft as compared to the material of the line or element L.

A removable retaining plug 40 having a bore 40a which preferably is of substantially the same diameter as the bore 10b is disposed for retaining the stop ring 37 in a fixed position within the housing 14. Thus, the plug 40 has an internal diameter with respect to the bore 40a which corresponds with the external diameter of the external surfaces 37c when the segments of the ring 37 are adjacent to each other as illustrated in FIG. 1. Thus, the centering plug 40 serves to hold the split ring 37 together when in the assembled position of FIG. 1. The plug 40 has its lower end 40b in engagement with the inclined surface 37d of each of the segments of the ring 37 so that when the plug 40 is in the connected position with respect to the housing 14, the ring 37 is held in engagement with the upper surface of the wiping element 35. The plug 40 has external threads 40c which are in releasable threaded engagement with internal threads 14c at the upper end of the housing 14. Such threads are preferably relatively coarse to provide for a rapid release and removal of the plug 40 when desired to repair or replace components of the apparatus W.

It is to be noted that the plug 40 has a reduced external diameter in its lower portion 40d which forms a recess enclosed by the housing 14. A coil spring 50 or other suitable resilient means is disposed within the recess provided by the reduced diameter portion 40d of the plug 40 to provide a returning force downwardly on the piston 20 to return it to its lowermost position when the pressure in the piston chamber is released or reduced. The piston 20 preferably has an annular recess 20d which forms a pocket for receiving the lower end of the coil spring 50. A similar recess 40e is provided on the plug 40 for receiving the upper end of the coil spring 50.

It is to be noted that the upper end 20c of the annular piston 20 extends above the lower end of the plug 40 so that the wiping element 35 is completely confined and carried by the piston 20 and the ring 30 during the longitudinal compression and lateral distortion of the wiping element 35. Thus, when the movable ring 30 moves upwardly with the piston 20 relative to the housing 14 and the stop ring 37, it will be appreciated that the lateral distortion resulting from the longitudinal compression of the wiping element 35 causes an increased sealing contact between the internal surface 35a of the wiping element 35 with the external surface of the wire-line or other elongate element L to effect a wiping or stripping action.

The upper end 20c of the annular piston 20 preferably has a pair of notches 20d therein which are adapted to be positioned in alignment with a longitudinal slot 14d in each side of the housing 14. Thus, when the plug 40 and the ring 37 have been removed from the housing 14, and the coil spring 50 has also been removed therefrom, a bar or rod may extend through the pair of openings or slots 14d and may be disposed in the notches 20d to prevent rotation of the piston 20. It is desirable to prevent rotation of the piston 20 when removing the lower movable ring 30 from the piston 20 by a rotation with a spanner wrench which has lugs fitting into the spanner wrench openings 30d, as previously explained.

In order to obtain an indication of the extent of wear on the inner surface 35a of the wiping element 35 without actually removing the component parts from the assembly of the apparatus W, it is desirable to provide a scale or indications 60 on the external surface of the plug 40 in alignment with at least one of the slots 14d so that an operator may visually see the extent of change in the position of the upper end 20c of the piston 20 during various periods of usage of the apparatus W. For example, as wear on the surface 35a occurs, the piston 20 moves upwardly a correspondingly greater amount than prior to such wear in order to obtain the sealing action between the element 35 and the line L. The amount of such wear will be indicated by changes in the position of the end 20c with respect to the marks 60 when the piston 20 is in the raised position for engaging the wiping element 35 in sealing contact with the line L.

In the use or operation of the apparatus W of this invention, the body 10 is threaded or otherwise connected to a section of well tubing or other well head equipment so that the wire-line or other elongate element L may pass through the apparatus W. Under normal conditions of operation with the line L passing downwardly in the well and with respect to the apparatus W, the wiping element 35 is in the extended or uncompressed position shown in FIG. 1. The spring 50 serves to urge the piston 20 to its lowermost position, the lower extent of which is determined by the engagement of the ring 30 with the upper end 10d of the body 10 in the preferred form of the invention, so that the element 35 is in its extended position.

When it is desired to wipe the line L, which normally occurs as the line L is being drawn upwardly with respect to the apparatus W, so as to wipe well fluids and mud from the line L, air or other fluid under pressure is introduced through the port or opening 14c from the source (not shown) so as to urge the piston 20 upwardly. The upward travel of the piston 20 carries the ring 30 therewith and serves to compress the wiper 35 longitudinally and distort it laterally inwardly into sealing and wiping engagement with the external surface of the wire line or element L. The extent of upward travel of the piston 20 depends upon the amount of wear which has resulted with respect to the inner surface 35a of the wiping element 35, so that the vertical position of the upper end 20c of the piston 20 has visually indicated by the mark 60, is an indication of the wear on the wiping element 35. Thus, an operator may visually inspect the condition of the wiping element 35 without removing same and thereby determine readily when the apparatus W is to be disassembled for replacement of the wiping element 35.

When it is desired to replace any of the components of the apparatus W, the pressure in the piston cylinder 10c is released or reduced to return the piston 20 to its lowermost position as seen in FIG. 1. The plug 40 is then moved upwardly on the line L by releasing the threaded engagement between the threads 40c and 14c. The coil spring 50 may then be removed, and the split ring 37 may be lifted upwardly and then split to remove it from the line L. The wiping element 35 may be lifted upwardly and pulled laterally off of the line L through the slot 35c therein. Then, the lower movable ring 30 may be rotated by inserting a spanner wrench into the openings 30d and rotating the ring 30 relative to the piston 20. As previously explained, the annular piston 20 may be prevented from rotating by positioning a rod or bar through the notches 20d if necessary. When the ring 30 has been unthreaded from the piston 20, it is moved longitudinally upwardly until it is above the housing 14, at which point, the segment 31 may be removed so that the rest of the ring 30 may be laterally moved from the lines L. Thus, the parts which are subjected to wear, namely the wiping element 35, the movable ring 30 and the stop ring 37, are readily removable for replacement and/or repair purposes. Such removal and repair can be accomplished without taking the apparatus W away from the line L.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. Apparatus for wiping a wire-line, rod, pipe or other elongate element, comprising:
   (a) a body having a longitudinal bore therethrough for the longitudinal movement of an elongate element therein,
   (b) said body having an external annular recess,
   (c) a housing releasably connected to said body and extending around said annular recess to form an annular piston cylinder,
   (d) an annular piston extending into said piston cylinder for longitudinal movement relative to said housing,
   (e) said housing having passage means through which fluid under pressure may be introduced in said cylinder for longitudinally moving said piston,
   (f) a wiping element formed of a resilient material and having a longitudinal opening therethrough for wiping the elongate element therein,
   (g) a stop ring in said housing and engaged by one end of said wiping element,
   (h) a movable ring carried by said annular piston and engageable with the other end of said wiping element for longitudinally compressing and laterally deforming the wiping element upon a longitudinal movement of the piston,
   (i) said annular piston being disposed between the external surface of said wiping element and the housing for preventing frictional contact of the wiping element with the housing as it is longitudinally compressed and laterally deformed,
   (j) rotatably releasable connecting means on said movable ring and said piston for releasably connecting said movable ring to said piston for movement therewith, and
   (k) said movable ring having a segment thereof which is laterally movable from the rest of the ring after said connecting means is released so as to permit a removal of said movable ring laterally from the elongate element.

2. Apparatus for wiping a wire-line, rod, pipe or other elongate element, comprising:
   (a) a body having a longitudinal bore therethrough for the longitudinal movement of an elongate element therein,
   (b) said body having an external annular recess,
   (c) a housing releasably connected to said body and extending around said annular recess to form an annular piston cylinder,
   (d) an annular piston extending into said piston cylinder for longitudinal movement relative to said housing,
   (e) said housing having passage means through which fluid under pressure may be introduced in said cylinder for longitudinally moving said piston,
   (f) a wiping element formed of a resilient material and having a longitudinal opening therethrough for wiping the elongate element therein,
   (g) a stop ring in said housing and engaged by one end of said wiping element,
   (h) a movable ring carried by said annular piston and engageable with the other end of said wiping element for longitudinally compressing and laterally deforming the wiping element upon a longitudinal movement of the piston,
   (i) said annular piston being disposed between the external surface of said wiping element and the housing for preventing frictional contact of the wiping element with the housing as it is longitudinally compressed and laterally deformed, and
   (j) said housing having a slot through its wall for exposing a portion of the piston for visually indicating the extent of wear of the wiping element.

3. Apparatus for wiping a wire-line, rod, pipe or other elongate element, comprising:
   (a) a tubular body at the lower end of the apparatus having a longitudinal bore therethrough for the longitudinal movement of an elongate element therein,
   (b) said body having an upper external annular recess and threads therebelow,
   (c) a substantially cylindrical housing having internal threads releasably connected to said threads on said body and extending around said annular recess to form an annular piston cylinder,
   (d) an annular piston extending into said piston cylinder for longitudinal movement relative to said housing and said body,
   (e) said housing having passage means through which fluid under pressure may be introduced in said cylinder for longitudinally moving said piston,
   (f) a wiping element formed of a resilient material and having a longitudinal opening therethrough for wiping the elongate element therein,
   (g) a stop ring in said housing and engaged by one end of said wiping element,
   (h) a movable ring carried by said annular piston and engageable with the other end of said wiping element for longitudinally compressing and laterally deforming the wiping element upon a longitudinal movement of the piston,
   (i) said annular piston being disposed in contact with the external surface of said wiping element and inside of the bore of the housing for preventing frictional contact of the wiping element with the housing as it is longitudinally compressed and laterally deformed,
   (j) an annular retaining plug releasably threaded to said housing and engageable with said stop ring to releasably hold said stop ring in contact with one end of said wiping element,
   (k) said plug extending inwardly of one end of the housing and having an external diameter which is less than the internal diameter of said housing to form an annular chamber in longitudinal alignment with said annular piston cylinder and on the opposite end of said wiping element from said cylinder,
   (l) said piston extending into said annular chamber, and
   (m) a compressible spring disposed in said chamber in engagement with said retaining plug and said piston for exerting a returning force on said piston.

References Cited

UNITED STATES PATENTS

| | | | |
|---|---|---|---|
| 2,559,321 | 7/1951 | Seamark | 277—73 |
| 2,846,178 | 5/1958 | Minor | 277—73 X |
| 3,132,867 | 5/1964 | Scaramucci | 277—2 |
| 3,228,703 | 1/1966 | Wilson | 277—73 |

SAMUEL ROTHBERG, *Primary Examiner.*